United States Patent
Moulart et al.

(10) Patent No.: US 7,505,944 B2
(45) Date of Patent: Mar. 17, 2009

(54) METHOD AND SYSTEM OF PAYMENT BY ELECTRONIC CHEQUE

(75) Inventors: Yves Moulart, Bruxelles (BE); Joan Daemen, Landen (BE); Michel Dawirs, Wezembeck Oppem (BE)

(73) Assignee: Proton World International, Brussels (BE)

( * ) Notice: Subject to any disclaimer, the term of this patent is extended or adjusted under 35 U.S.C. 154(b) by 441 days.

(21) Appl. No.: 11/027,420

(22) Filed: Dec. 30, 2004

(65) Prior Publication Data

US 2006/0287955 A1 Dec. 21, 2006

Related U.S. Application Data

(63) Continuation of application No. 09/492,307, filed on Jan. 27, 2000, now abandoned.

(30) Foreign Application Priority Data

| Jul. 25, 1997 | (BE) | ................................. 9700645 |
| Jul. 23, 1998 | (BE) | ..................... PCT/BE98/00115 |

(51) Int. Cl.
*G06Q 99/00* (2006.01)
(52) U.S. Cl. ............................ 705/75; 705/64; 705/67; 713/150; 380/277
(58) Field of Classification Search ............ 705/64–79; 713/150, 155, 182; 380/255, 277
See application file for complete search history.

(56) References Cited

U.S. PATENT DOCUMENTS

| 5,534,857 A | * | 7/1996 | Laing et al. ................. 340/5.74 |
| 5,794,207 A | * | 8/1998 | Walker et al. ................... 705/1 |
| 5,809,144 A | * | 9/1998 | Sirbu et al. .................... 705/53 |
| 5,974,178 A | * | 10/1999 | Kitayoshi .................... 382/210 |
| 2003/0097344 A1 | * | 5/2003 | Chaum et al. ................. 705/75 |

OTHER PUBLICATIONS

Applied Cryptography, Second Edition, Bruce Schneier, 1996.*

* cited by examiner

*Primary Examiner*—Jalatee Worjloh
(74) *Attorney, Agent, or Firm*—Lisa K. Jorgenson; Robert Iannucci; Seed IP Law Group PLLC (57) ABSTRACT

An offline payment method includes communicating a commitment value calculated by an electronic check medium to a terminal configured to receive a payment from the electronic check medium. The commitment value is calculated based on a first authentication code and secret key, wherein the first authentication code is calculated based on a payment amount and secret verification key. The terminal determines and communicates a random/pseudo-random guesstimation to the electronic check medium in response to receiving the verification code, the random/pseudo-random guesstimation being configured to verify that the electronic check medium is authentic. The electronic check medium determines and communicates a second authentication code to the terminal, the second authentication based upon the random/pseudo-random guesstimation. The terminal compares the second authentication with the random/pseudo-random guesstimation to verify the second authentication and accepts payment from the electronic check medium when the second authentication is verified.

20 Claims, 3 Drawing Sheets

METHOD AND SYSTEM OF PAYMENT BY ELECTRONIC CHEQUE

This application is a continuation of pending U.S. patent application Ser. No. 09/492,307, filed Jan. 27, 2000, which claims priority to PCT Application No. PCT/BE98/00115, filed Jul. 23, 1998, which claims priority to Belgium Application No. 9700645, filed Jul. 25, 1997.

The present invention relates to a method of payment by electronic cheque, in particular in the case of a direct transaction between solely, on the one hand, a payment issuer furnished with a medium comprising at least one blank electronic cheque certified by a financial institution and an overall amount useable at least partially in respect of the electronic cheque, and, on the other hand, a recipient of the payment furnished with a device adapted to receive at least one aforesaid electronic cheque of the abovementioned medium.

Numerous problems arise in the securing of such payment systems, in particular when these payments are desired to be made in a so-called "off-line" manner, that is to say with no link with the main computer of a financial institution such as a bank or a company for managing payments by electronic memory card and means of electronic dialogue.

One practice which is currently spreading is the storage, in an electronic payment card, of blank cheques. In this case, there is an imperative need to be certain that each electronic cheque can serve once only, is certified as authentic by a financial institution, or better still an empowered authority, and will be reimbursed to the recipient of the payment by the financial institution of his choice.

For this purpose, use is made of procedures for transporting, exchanging and verifying signatures between what has been referred to hereinabove as a medium and a device. In such procedures, it is deemed that too many security elements to be kept secret may be violated by third parties seeking to use for example one and the same cheque several times, whether this be at the level of the aforesaid issuer of the cheque or of the recipient thereof, whether the issuer and the recipient are or are not conniving, whether one is attempting to steal from the other or one of the financial institutions, the one issuing the electronic cheque or the one which pays it to the recipient.

The purpose of the present invention is to solve these problems and to carry out such payments with a monitoring of the latter which is least prone to fraud in an "off-line" service, by organizing an interoperability between the said medium and device.

The term interoperability should be understood to mean the possibility of secure cooperation of payment between a medium for example emanating from a Belgian institution and a device emanating from a foreign institution and located abroad, or else emanating from another Belgian institution and located in Belgium, and whose secure cooperation is possible without the sharing of one or more secret keys between the two institutions and hence between the medium and the device.

It goes without saying that the solution brought to these problems may also find a definite application in, for example, the exchanging of digital data recorded on a medium, so as to be certain that they are authenticated by whom it may concern, and not acquired fraudulently, so as to be supplied to a recipient who acquires them in good faith or not to be supplied to a recipient having no entitlement thereto.

To solve these problems, the method of the invention comprises, so that the device can recognize the authenticity of the medium and of a cheque being received, a calculation by the medium of a table, possibly partial, on the basis of at least one set of k base values, by applying successively to each of them n times an irreversible function with parameter(s) differing preferably with each application and giving k intermediate values n times, a calculation by the medium of a secret key on the basis of the last k intermediate values of order n and, on the basis of this key, a calculation of a distinctive sign of the cheque, a transmission by the medium to the device of the distinctive sign calculated for the electronic cheque, a financial commitment of the medium in relation to the device, as regards the cheque, by supplying to the device, a first result of an irreversible function via which was processed the result of a first algorithm combining a secret verification key, originating from the financial institution issuing the electronic cheque, and dynamic parameters of this cheque, and a second result of a second algorithm combining the secret key calculated for the medium, the dynamic parameters of this cheque and the first result hereinabove, at least one random/pseudo-random guesstimation, by the device (3), of k numbers m of successive applications of the irreversible function to the k base values, the k numbers m lying between zero and n and possibly being different from one another, the sum of the k numbers m having to be a determined constant, a transmission of the result of the guesstimation by the device to the medium, a response by the medium to the said guesstimation by the device, comprising on the one hand the result of the first algorithm combining the secret verification key and the dynamic parameters of the cheque and, on the other hand, a set of the k intermediate values obtained during the successive applications of the irreversible function to each of the k base values the number or numbers of times m lying between zero and n, by the device:

successive applications of the irreversible function to each of the k intermediate values of order(s) m until the last k intermediate values of order n are obtained, a calculation of the said secret key on the basis of these last k intermediate values of order n and, on the basis of this secret key, a calculation of the distinctive sign of the cheque, a comparison of the distinctive sign thus calculated and of the distinctive sign calculated by the medium and received from the latter, a verification by calculation and comparison in the device of the said second result of the second algorithm and of that received from the medium, a verification by calculation and comparison in the device of the said first result of an irreversible function and of that received from the medium and, if the said comparison and verifications each give equality, an acceptance and a storage by the device of the electronic cheque issued by the medium.

Thus the use is avoided, for example, of special-purpose cards (or media) furnished with cryptography integrated circuits using public key algorithms, for example RSA, known in the art, developed by RSA Data Security Inc. Redwood City, Calif. USA or of cards operating with globalization of DES keys (Data Encryption Standard), or some other secret key encryption algorithm also known in the art.

Advantageously, the sum of the k numbers m is a constant equal to $n*k/2$ if the product $n*k$ is even or, if this product is odd, to $(n*k-1)/2$.

According to one embodiment of the invention, the method comprises:

a storage in the medium of at least one electronic cheque template useable to make at least one aforesaid cheque, a transmission by the medium to the device of:

a series of h distinctive signs of a cheque, each associated with a distinct set of k base values contained in the medium, an index, lying between 1 and h, for designating a particular distinctive sign from among the h aforementioned distinctive signs, a digital signature produced by the issuing financial institution so as to guarantee the said distinctive signs, and a use by the device, for the said comparison, of the particular distinctive sign determined by the index in the guise of distinctive sign received from the medium, and a verification by the device of the said digital signature by means of a public key known to the device.

According to one mode of realization, the method of the invention comprises, in respect of the transaction, a transmission by the medium to the device of non-secret data which may be the identification of the financial institution which certifies the electronic cheque and, as appropriate, the public key of the issuing financial institution and a certificate of the abovementioned public key issued by a certificate authority. The device can verify in this case the authenticity of the said certificate by means of another public key, known to the device, of the certificate authority.

According to one particular embodiment of the invention, the medium can be reloaded at least as regards its overall amount and/or its number of electronic cheques in the course of a link with the abovementioned financial institution or one of its delegates.

According to one embodiment of the invention, the method comprises, for the calculation of the table by the medium, a mother base value common to each column of the table, and an application to this mother base value of at least one irreversible function preferably with different parameter(s) for each column so as to obtain the said k base values.

According to an advantageous embodiment of the invention, in the course of a reloading of the medium, it is furthermore supplied with an identification of cheque templates, updated abovementioned static parameters, a series of h distinctive signs, an abovementioned digital signature and a determined number of base values or, as appropriate, of at least one aforesaid common base value.

According to another advantageous embodiment of the invention, the device records, during a transaction, the result of the first algorithm and/or, as appropriate, an identification of the aforesaid financial institution and/or an identification of the template of the electronic cheque received and/or the identification of the medium.

According to a particularly advantageous embodiment of the invention, the process makes provision for the fact that in respect of incremental payments of the kind by telephone card, the dynamic parameters of the cheques moreover comprise:

the amount or the sequence of amounts corresponding to the authorized incremental payments, a base chaining value, a chaining of successive chaining values which each stem successively from the application of an irreversible function to the immediately following chaining value, and that after having performed with the hereinabove device a protocol for payment by electronic cheque, the medium can perform an incremental payment by supplying the receiving device with successive chaining values, the device preserving a record of the last chaining value received and of the corresponding index.

According to another particularly advantageous embodiment of the invention, the method comprises a cancellation of a transaction of payment by cheque from the medium to the device. For this purpose, the method can comprise, on the one hand, a storage, in the device, of at least one electronic cheque template, issued by the financial institution of the device, and of secret data relating to this template and, on the other hand, a programming of the medium in such a way that the latter cannot receive a payment by cheque other than from the device to which a transaction was previously paid by means of the said medium, the latter storing the cancellation payment cheque until the medium is presented to its corresponding financial institution, in particular for a reloading of the medium.

Preferably, the method of the invention furthermore comprises steps of inverse authentication via which the medium can for its part recognize the authenticity of the device. For this purpose, the steps of inverse authentication can be of the same kind as those for the authentication of the medium, whilst requiring, as appropriate, only a single distinctive sign of electronic cheque template.

According to another preference, the method of the invention can comprise, for at least some of the inverse authentication steps, the use of an element for communication between the medium and the device, this communication element preferably being held by the payment issuer which holds the said medium.

In order to increase the number of times that the same cheque template can serve to make a distinct cheque, the method comprises, in the medium, a combination of each of the various distinctive signs, at a first level, by means of irreversible functions each time with another value or another distinctive sign; the results of each pair of applications of the irreversible function are thereafter combined at a second level via another application of the irreversible function so as to give new results to be combined at a third level via one or other applications of the irreversible function and so on and so forth until a single result is obtained, and which is signed, as deduced distinctive sign, for the digital signature so as to sign the cheques issued.

Then, for a verification by the device of the deduced distinctive sign, the method can comprise a transmission from the medium each time of the second distinctive sign used in a first combination at the first level and, at each succeeding level, of the intermediate result of the irreversible functions, which is used so as to be combined successively with the corresponding intermediate result obtained on the basis of the second distinctive sign, until the deduced distinctive sign is obtained.

The invention also relates to a payment system for implementing the method hereinabove. For this purpose, the system of the invention comprises at least one medium furnished
with means for storing at least
a blank electronic cheque certified by a financial institution,
an overall amount useable at least partially in respect of the electronic cheque,
at least one distinctive sign for this cheque, which may be included in the latter,
at least one set of k base values which may be derived from a single common mother value, a secret verification key originating from the financial institution issuing the electronic cheque, and dynamic parameters of the said cheque, and with means of calculation of a table on the basis of the k base values, by applying successively to each of them n times an irreversible function with parameter(s) differing preferably with each application and giving k intermediate values n times, of a secret key on the basis of the last k intermediate values of order n and, on the basis of this key, of a distinctive sign of the cheque, of a first result of an irreversible function via which was processed the result of a first algorithm combining the secret verification key and dynamic parameters of the cheque, and of a second result of a second algorithm combining the secret key calculated for the medium and the dynamic parameters of this cheque and of the aforementioned first result, and with means of direct dialogue with at least one device adapted to receive at least one aforesaid electronic cheque from the abovementioned medium and among other things the distinctive sign of the said cheque, the device being equipped with means of random/pseudo-random guesstimation of k numbers m of successive applications of the irreversible function to the k base values, the k numbers m lying between zero and n and possibly being different from one another, the sum of the k numbers m having to be a determined constant, with means of direct dialogue corresponding to those of the medium, so as among other things to carry out a transmission of the result of the guesstimation to the medium, with means of calculation successively applying the irreversible function to each of the k intermediate values of order m until the last k intermediate values of order n are obtained, of the said secret key on the basis of these last k intermediate values of order n and, on the basis of this key, a calculation of the distinctive sign of the cheque, means of comparison of the distinctive sign thus calculated and of the distinctive sign calculated by the medium and received from the latter, means of verification by calculation and comparison of the said second result of the second algorithm and of that received from the medium, means of verification by calculation and comparison of the said first result of an irreversible function and of that received from the medium and, means of storage of at least the electronic cheque issued by the medium, if the said comparison and verifications each give equality.

According to one embodiment of the system of the invention, the means of storage of the medium are devised so as to store at least one electronic cheque template useable to make at least one aforesaid cheque, the means of dialogue of the medium are devised so as to transmit to the device: a series of h distinctive signs of a cheque, each associated with a distinct set of k base values contained in the medium, an index, lying between 1 and h, for designating a particular distinctive sign from among the h aforementioned distinctive signs, and a digital signature produced by the issuing financial institution so as to guarantee the said distinctive signs, and the device is devised so as to use, for the said comparison, the particular distinctive sign determined by the index in the guise of distinctive sign received from the medium, and the device comprises means of calculation devised so as to verify the said digital signature by means of a public key known to the device.

According to another embodiment of the system of the invention, the means of dialogue of the medium are devised so as to transmit to the device non-secret data which may be the identification of the financial institution which certifies the electronic cheque and, as appropriate, the public key of the issuing financial institution and a certificate of this public key issued by a certificate authority. Therefore, the device can be devised so as to verify the authenticity of the said certificate by means of another public key, known to the device, of the certificate authority.

Advantageously, the system according to the invention comprises as medium a payment card of the integrated circuit type and as device a payment terminal with reading and writing for a card of this type.

As a variant, the system according to the invention comprises as medium a payment card of the integrated circuit type and as device a payment terminal with reading and writing for a card of this type and furnished with means of transferring data received from the said card, and/or processed by the terminal, into storage means detachable from the terminal proper and in particular transportable to a financial institution so as to perform therein a transfer of the said data.

According to another variant of the system according to the invention, in particular in the case where the device is remote from the issuer of the payment and/or in the case of steps of inverse authentication of the device by the medium, the abovementioned medium is composed among other things, on the one hand, of the aforesaid integrated circuit card and, on the other hand, of a communication element, for dialogue between the card and the said device.

Other details and particular features of the invention will emerge from the secondary claims and from the description of the drawings which are appended to the present document and which illustrate, by way of non-limiting example, the method of the invention and a particular system of the invention for implementing the method.

In the various figures, the same reference notation designates identical or similar elements.

The method of the invention is especially intended to carry out a protocol for payment by electronic cheque in what is referred to, as explained hereinabove, as a so-called "off-line" situation. This payment protocol implements interoperability between (FIG. 1) an aforesaid electronic cheque medium 1, which may be a card 2 of the bank card, credit card, debit card kind etc., having an integrated circuit for storage and calculation and an electronic cheque receiving device 3 which can be a terminal 4 with reading and writing for the said integrated circuit card 2.

Figure 1:
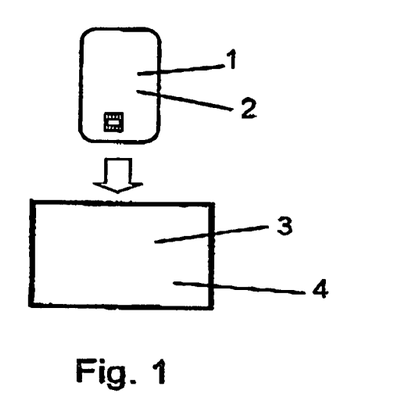
FIG. 1 shows diagrammatically one embodiment of a system allowing the implementation of a mode of realization of the payment method.

An objective of the present invention consists in the card 2 and the terminal 4 being devised so as to execute an authentication of the electronic cheque to be transmitted by the card 2, for example from a purchaser, to the terminal 4, for example of a merchant who the purchaser must pay for a purchase, based on at least one random/pseudo-random guesstimation on the part of the terminal 4 and a corresponding response from the card 2.

To do this, the card 2 and the terminal 4 have in memory, as elements known in common by each of them, nothing but irreversible functions and/or algorithms and a MAC algorithm explained hereinbelow. Apart from this, the card 2 has in memory a public key $PK_B$ of a financial institution, such as the bank BA (FIG. 6) of the holder of the card 2, and a public key certificate $CERT_B$ signed electronically by an authority for certifying this public key $PK_B$ of the bank BA. For its part, the terminal 4 possesses in memory a public key $PK_{CA}$ which can be certified by the same certificate authority. In the present invention, there is advantageously no necessity for the card 2 to have the capability of calculating public key algorithms, except for special cases.

The protocol described hereinbelow corresponds to a situation in which:
  a purchaser wishes to pay a merchant for a purchase using an electronic cheque,
  the purchaser holds for this purpose an integrated circuit card 2 (an electronic cheque medium 1) supplied by his bank BA,
  the merchant holds for this purpose a terminal 4 (electronic cheque receiving device 3) supplied to him by his bank BB, and
  the electronic payment is carried out without there being any link established with one BA or the other BB of the two banks concerned or any other financial institution or monitoring.

As the basis for the method, it is supposed that the purchaser or holder of the card 2 trusts his bank BA which loads his card 2.

The sought-after security obtained by the invention consists in:
  the bank BA of the purchaser having to be certain that it will only have to pay genuine electronic cheques issued by the card 2 of the purchaser, hence no cheques fraudulently duplicated or altered by the purchaser or a third party nor any cheques fraudulently made by the merchant,
  the merchant wishes to be certain that his bank BB will agree to credit him with the electronic cheque received from the purchaser,
  the bank BB of the merchant wishes to be certain that a cheque accepted in payment by the merchant will be accepted without any subsequent problem by the bank BA of the purchaser.

The protocol for payment by electronic cheque, according to the invention, uses the following cryptographic functions (FIG. 2) known to the person skilled in the art:
  a public key signature verification (by an RSA algorithm with small public exponent, RSA being the initials of the inventors Rivest, Shamir and Adleman of this algorithm),
  an MAC algorithm combining a key and data, MAC standing for "Message Authentication Code" (this algorithm being based on what is referred to in cryptography as a "Triple DES" or "Triple Data Encryption Standard", that is to say a system for encrypting data by applying the DES algorithm three times,
  a first parametrized irreversible function, henceforth denoted OWF (One Way Function=irreversible function), combining data and parameters,
  a second parametrized irreversible function, henceforth denoted SOWF, combining data and parameters, and
  an irreversible compression function, henceforth denoted OWHF (One Way Hash Function), also combining parameters and data.

These functions may be implemented by calculation means contained in the integrated circuit of the medium 1 or card 2. At the location of the card 2, the present invention avoids the need to produce a signature by using a public key algorithm.

The medium 1 or card 2 contains, in a memory included in its integrated circuit, at least one non-secret electronic cheque template CF comprising indications relating to this template CF, such as for example:
  $ID_{CF}$: an identification of the template CF,
  $ID_C$: an identification of the card 2,
  $SP_{CF}$: so-called static parameters associated with the template, such as for example a date of expiry of validity and an authorized maximum transaction amount,
  $IM_{CF}[1 \ldots h]$: a series of h distinctive signs,
  $SIGN_{CF}$: a digital signature supplied by the bank BA in order to authenticate $ID_{CF}$, $SP_{CF}$ and $IM_{CF}[1 \ldots h]$.

The medium 1 or card 2, depending on the particular case, can contain in its memory non-secret information regarding its bank BA which issued the electronic cheque or cheques contained in the card 2, such as:
  $ID_B$: an identification of the bank,
  $PK_B$: the public key of the bank,
  $CERT_B$: a public key certificate signed by the certificate authority which thus authenticates $ID_B$ and $PK_B$,
  as a variant, a date of expiry of the certificate $CERT_B$.

The expression (electronic) cheque template should be understood here to mean a document (electronic) to be completed with data (dynamic parameters) so that it becomes a unique (electronic) cheque.

The card 2 can also contain at least one set of base values $S[1], \ldots [k]$, associated with one or each distinctive sign $IM_{CF}[i]$, i lying between zero and h, and a secret key SVK associated with the cheque template CF with a view to a verification by the bank BA of the cheque tracked by means of this cheque template. Thus, what is referred to hereinabove as a blank cheque may in fact be regarded as an uncompleted or partially completed cheque template.

If the combination of signatures which is used makes it possible to recover data, some of the signed data will preferably be integrated into these signatures themselves, as is known in the art.

Figure 2:
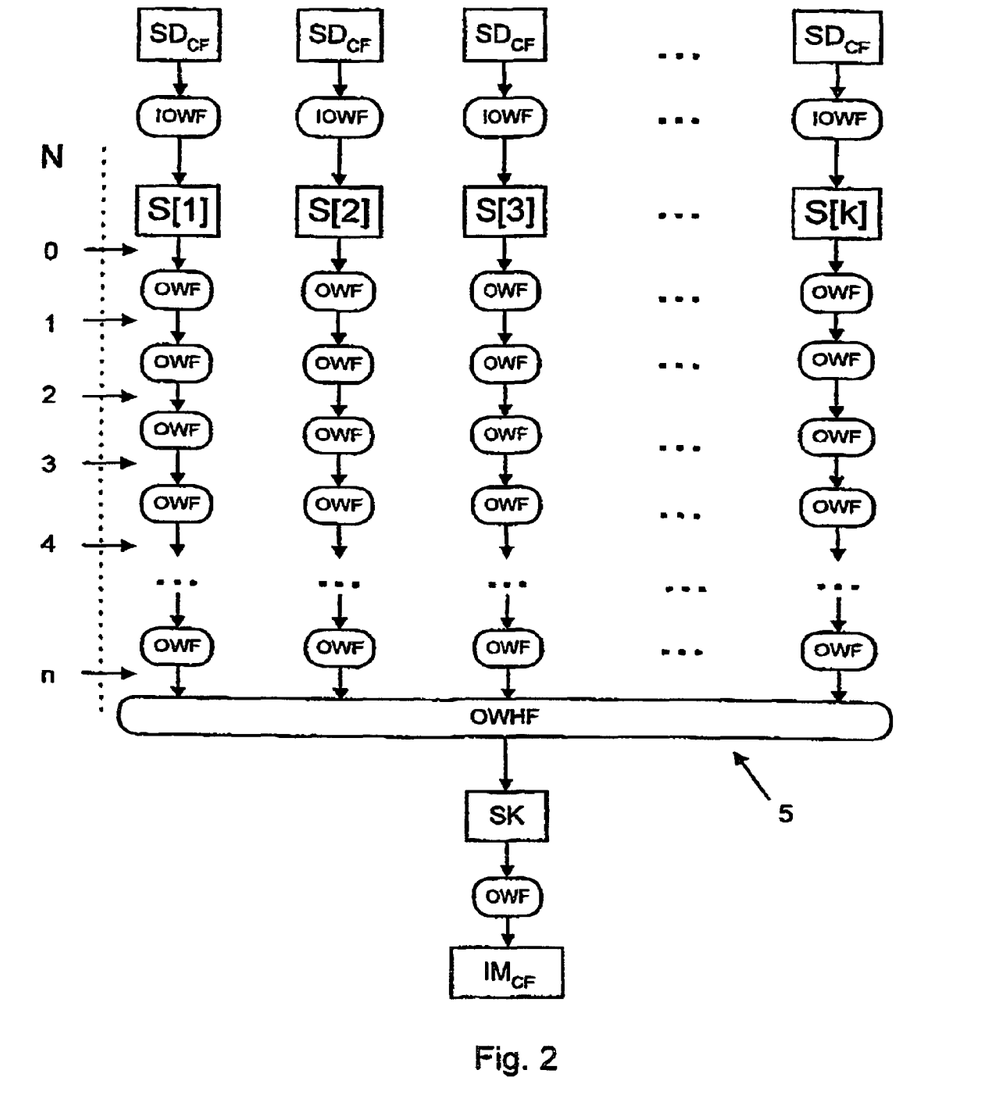
FIG. 2 shows diagrammatically steps for constructing a table of values making it possible to verify and/or calculate a distinctive sign for a cheque.

As shown by FIG. 2, a particular distinctive sign $IM_{CF}$ depends on the base values $S[1], \ldots S[k]$, or even on a common or mother base value $SD_{CF}$ dubbed the SEED which, by applying an irreversible function SOWF, gives these various base values $S[1], \ldots S[k]$.

The irreversible functions OWF, SOWF and OWHF applied in the case of FIG. 2 have each time at least one parameter whose value is different from one application to another in Table 5. This different parameter can be the parameter of the row or level N (1 to n) and/or that of the column (1 to k) and/or that of the index i of $IM_{CF}[i]$, and/or $ID_{CF}$ and/or $ID_B$ depending on the particular case.

The irreversible functions OWF, SOWF and OWHF used according to FIG. 2 are moreover chosen in such a way that, knowing their respective results, it is not possible to find the corresponding input data or, if the input data are known, to find input data different from the aforesaid data and which give the same results.

The said irreversible functions may be chosen as follows:
the functions OWF may be implemented with a block encryption with a block and key dimension of 64 or 80 bits,
the functions SOWF may be implemented with a block encryption with a block and key dimension of 128 or 160 bits. The results obtained are truncated to 64 or 80 bits respectively,
the function OWHF can be implemented in the form of a compression function (hash function) known in the art (for example the function dubbed SHA-I).

A basic protocol for payment by electronic cheque according to the invention can comprise the steps hereinbelow.

When the purchaser prepares his electronic cheque, he completes a cheque template CF with so-called dynamic parameters CDP for this cheque, namely for example:
the date and time of the payment,
the amount and the chosen currency (depending among other things on the country in which the cheque transaction is effected), and
preferably an identification $ID_D$ of the recipient of the cheque (the merchant or the device 3).

The management of these dynamic parameters by the medium 1 and by the device 3 does not form part of the present invention but is known in the art.

The medium 1 or card 2, inserted for example into a card reader of the device 3, sends the latter various parameters from among those cited hereinabove, preferably:
$ID_B$; the identification of the issuing bank BA,
$ID_C$: the identification of the medium 1
$PK_B$: the public key of this bank BA,
$CERT_B$: the certificate of these two parameters,
$ID_{CF}$: the identification of the cheque template CF,
$SP_{CF}$: aforesaid static parameters of this electronic cheque template,
$IM_{CF}[1 \ldots h]$: a series of h aforesaid distinctive signs,
$SIGN_{CF}$: a digital signature of the bank BA,
i: the index indicating which distinctive sign $IM_{CF}[i]$ of the series of h signs is used.

The device 3 verifies:
$CERT_B$ by using the certified public key $PK_{CA}$, and thereafter
$SIGN_{CF}$ by using the public key $PK_B$ of the bank BA.

At this juncture in the verification, however, the device 3 does not have sufficient proof that it is really communicating with a medium 1, on which fraud has not been perpetrated, such as delivered by the issuing bank BA. The information received from the medium 1 by the device 3 at this juncture could be a fraudulent copy.

The method of the invention makes provision for the fact that at this stage the medium 1 should make a commitment in relation to the device 3:
the medium 1 calculates an authentication code AC_I with a view to a subsequent verification by the issuing bank BA, via an MAC algorithm combining aforesaid dynamic parameters CDP and the secret verification key SVK:

$$AC\_I=MAC(SVK,CDP),$$

the medium 1 calculates therefrom, with the aid of an irreversible function OWF, a commitment value O_AC_I to be used in the payment by cheque protocol:

$$O\_AC\_I=OWF(AC\_I),$$

the medium 1 calculates an authentication code AC_C, via an MAC algorithm, on the basis of the secret key SK, of the dynamic parameters CDP and of the commitment value O_AC_I:

$$AC\_C=MAC(SK,CDP \blacklozenge O\_AC\_I),$$

♦: here signifies a chaining of data,
the medium 1 sends the results O_AC_I and AC_C to the device 3.

At this stage of the protocol, the device 3 still has no means of verifying the authentication codes AC_C. In fact, the device 3 still has no guarantee of being linked up with a medium 1 of certified origin.

As next step, the device 3 makes at least one random/pseudo-random guesstimation (or "challenge") for the purpose of verifying that it is actually the authentic medium 1 which is linked up for the payment of the cheque.

The random/pseudo-random guesstimation consists in giving for each of the k columns of FIG. 2 an order or level N between zero and n, that is to say therefore a series of k numbers m smaller than n+1. Preferably, the sum of the k numbers m (generally mutually different) of the quesstimation is equal to n*k/2 if n*k is an even product or, if the latter is odd, equal to (n*k−1)/2. The way in which this random/pseudo-random guesstimation is carried out does not form part of the invention, it is known to the person skilled in the art. Let it simply be said that it is carried out in a uniform and unpredictable manner within the set of possible guesstimations of this kind.

At this juncture, the device 3 transmits its random/pseudo-random guesstimation to the medium 1 and the latter responds by communicating to the device 3 the authentication code AC_I calculated and a set of k values which are for each column 1 to k of FIG. 2 the intermediate value of order or level m indicated in the guesstimation carried out by the device 3.

The device 3 in turn verifies the response of the medium 1 and, for this purpose, it calculates on the basis of the k intermediate values of levels m received, by applying the irreversible functions OWF of FIG. 2 an appropriate number of times, the result to be used for calculating the key SK by means of the irreversible function OWHF. On the basis of this key the device 3 then calculates the distinctive sign $IM_{CF}=OWF(SK)$ and verifies whether or not it corresponds to the value $IM_{CF}[i]$ used to verify the electronic cheque received. Thereafter, the device 3 verifies the authentication code AC_C by using the key SK and verifies the financial commitment value O_AC_I of the medium 1 by applying the suitable irreversible function:

$$O\_AC\_I=OWF(AC\_I).$$

If all the verifications and comparisons are positive, the device 3 accepts the payment by the electronic cheque and stores the "audit trail" thereof in a protected area of its memory This audit trail comprises:
$ID_B$: the identification of the issuing bank BA
$ID_{CF}$: the identification of the cheque template,
optionally $ID_C$: the identification of the medium 1 or card 2,
AC_I: the CDP authentication code.

After the protocol for payment by electronic cheque, the value $IM_{CF}[i]$ is regarded as used.

In the method of the invention, the number of payments which may be made with one and the same cheque template is h.

It is apparent that the secret key SK used to authenticate the dynamic parameters CDP is communicated only at the moment at which the exchanging of the guesstimation of the device 3 and of the response of the medium 1 takes place. From this moment onwards, the secret key must be regarded as having become public information.

The number of possible guesstimations which may be undertaken by the device 3 depends on the exact values of k and n and can readily be calculated. It is for example possible to choose n and k in such a way that this number of guesstimations is of the order of $4*10^{10}$, etc.

It will be understood that the response to a single guesstimation does not make it possible to deduce therefrom a response to any other guesstimation since there will be at least one column (FIG. 2) for which an intermediate value of a lower level is required.

A loading or reloading of the medium 1 with cheque template and amount or monetary value must be executed in a secure manner and is therefore carried out in a direct line ("on-line") with the financial institution or issuing bank BA or with any other authorized third party.

Since an electronic cheque template CF may only be used a determined number of times so that only a unique cheque which can be authenticated is made each time, each electronic cheque template is produced by the issuing financial institution BA and must be loaded in advance into the medium 1.

The data to be transmitted to the medium 1 when loading a cheque template are for example:
  $ID_{CF}$: the identification of the electronic cheque template,
  $SP_{CF}$: the static parameters of this template,
  $IM_{CF}[1 \ldots h]$: a series of h distinctive signs for cheques,
  $SIGN_{CF}$: a digital signature of the issuing bank BA regarding the data hereinabove $ID_{CF}$, $SP_{CF}$, $IM_{CF}[1 \ldots h]$ which may be included within this signature,
  in a variant stated hereinabove, a mother value or common base value $SD_{CF}$ which can be used by the medium to calculate the abovementioned base values $S[1 \ldots k]$ and thereafter the intermediate values of FIG. 2, up to each distinctive sign $IM_{CF}[i]$.

The mother or common base value $SD_{CF}$ is transmitted by the issuing institution BA to the medium 1 in an encrypted manner. To establish a secure communication between this institution BA and the medium 1, it is possible to use a straightforward MAC algorithm and encryption using keys deduced on the part of the medium 1 and main keys in the main computer of the institution BA. The person skilled in the art knows this.

The distinctive signs $IM_{CF}[1 \ldots h]$ of the electronic cheque depend on the mother or common base value $SD_{CF}$ and must consequently be calculated by the financial institution BA. This can be done in advance. At the moment of loading a medium 1, the signs $IM_{CF}[1 \ldots h]$ can be fetched from a data bank of the main computer.

It is absolutely essential to ensure that none of the distinctive signs $IM_{CF}[1 \ldots h]$ is used more than once and that the corresponding mother values $SD_{CF}$ are stored in encrypted form.

The deducing, from the mother value $SD_{CF}$ or from the base values $S[1 \ldots k]$, of the intermediate values of zero level in FIG. 2 does not come into the actual protocol for payment by electronic cheque. Hence, the choice of the irreversible function SOWF can be left to the issuing bank BA.

When the device 3 or terminal 4 (FIG. 6) is placed in communication with its own financial institution BB, it transmits to the latter the "audit trails" of the electronic cheque received, preferably comprising the identification $ID_D$ of the device 3. The financial institution BB sorts these audit trails and for example effects a clearance of the electronic cheque with the financial institution BA of the medium 1. For this purpose, the financial institution BB transmits the said audit trail to the financial institution BA for verification of the payment transaction by electronic cheque, described hereinabove, and receives an acknowledgement of receipt therefrom.

As a variant, the medium 1 can be devised so as to allow so-called incremental payments (or tick payments) in which case the medium 1 also contains in memory an additional amount or the abovementioned amount envisaged for cheques, whilst a suitable device 3 withdraws small successive sums as in the case of a public telephone to be paid for with a suitable card. The expression small sum is herein understood to mean a much smaller amount than that envisaged for an electronic cheque. For this purpose, the above protocol is tailored by appending to the abovementioned dynamic parameters CDP the following parameters:
  the sum or suns corresponding to withdrawals, and
  a base chaining value $Z_0$, to be used for the "withdrawal" part of the tailored protocol.

A chain of chaining values $Z_j$ is determined by an irreversible function applied to the following value $Z_{j+1}$:

$$Z_j = OWF(Z_{j+1}).$$

Upon a withdrawal, the medium 1 supplies values $Z_1$, $Z_2$, $Z_3$ corresponding to each small sum. The appropriate device 3 then preserves an audit trail of the last value $Z_j$ and of its index j which were received on the occasion of this payment.

A maximum number of withdrawals of small sums must be fixed in advance. For this purpose, provision may be made for an algorithm requiring little memory and calculational hardware.

The transaction protocol hereinabove may also be tailored so as to execute a payment by electronic cheque in the inverse direction, hence from the device 3 or terminal 4 to the medium 1 or card 2. For this purpose, the device 3 must contain an electronic cheque issued by its financial institution BB and a type of security means containing secret elements of this cheque. The medium 1 can be programmed for its part so as not to accept payments by cheque other than from a device 3 to which it has itself previously paid by cheque when, for example transacting a purchase of an object. Thus, a cancellation or a reimbursement of a purchase may be settled. A payment in the reverse direction does not in principle require authentication of the device 3, among other things upon reimbursement of a purchase, the purchaser being assumed to know and trust the merchant.

Generally, so as not to complicate the medium 1, the latter will only retain the audit trail of this reverse-direction payment as is, with a view to a presentation of this cheque to the financial institution BA issuing the medium 1, during a subsequent reloading of the latter. This financial institution BA can however decide to add, directly after payment or solely at a time when it is communicating with the medium 1, the value of this reimbursement cheque to the amount recorded in the medium 1.

The protocol or method described hitherto does not provide for inverse authentication of the device 3 in relation to the medium 1 and/or the financial institution BA of the latter.

Such reverse authentication can however be implemented using the same guesstimation and response pair, providing for this purpose just one distinctive sign $IM_{CF}$. This can prove useful for example in the case of payments via a communication network such as INTERNET.

In the protocol presented hitherto, the number of payments which may be made with a single blank cheque template is h (number of distinctive signs $IM_{CF}[i]$ given by the institution BA and to be appended to a cheque template so as to form a unique particular cheque).

Figure 3:
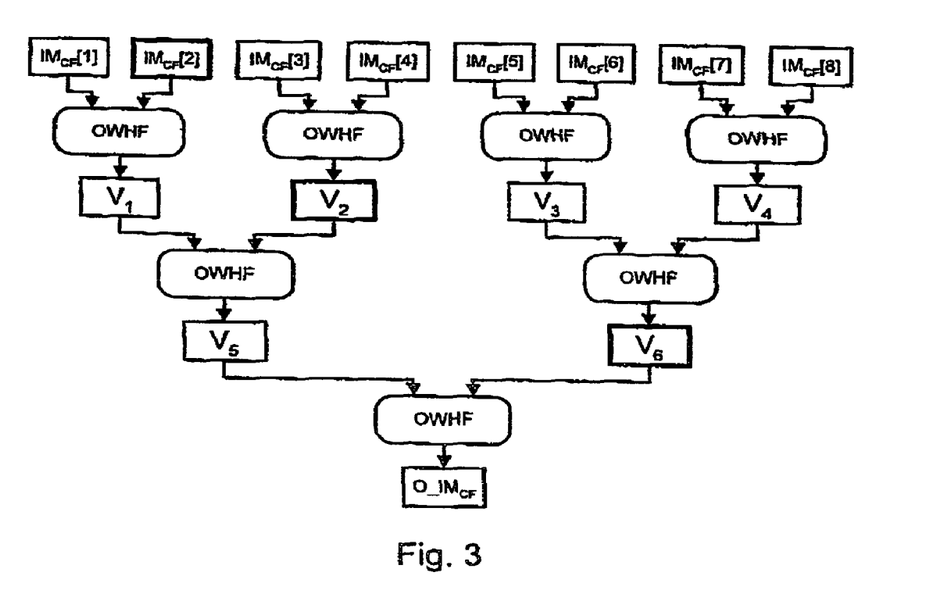
FIG. 3 shows diagrammatically steps for constructing values making it possible to calculate another type of distinctive sign for a cheque.

According to a variant of the invention, this number of payments with a single cheque template can be increased by using for example the combination of FIG. 3. In this combination, each of the various values $IM_{CF}[i]$ is combined, at a first level, by means of irreversible functions OWHF each time with another value which can also be a distinctive sign $IM_{CF}[i']$. The results $V_1$ and $V_2$ on the hand and $V_3$ and $V_4$ on the other hand of each pair of applications of the irreversible function OWHF are combined by another application of the irreversible function OWHF so as to give two new results $V_5$ and $V_6$ to be combined by one or other applications of the irreversible function until a unique result $O\_IM_{CF}$ is obtained which is now used as deduced distinctive sign in respect of the signature of cheques.

So as to make it possible, in the case of FIG. 3, for the device 3 to verify that the deduced distinctive sign $O\_IM_{CF}$ is actually obtained from the authenticated distinctive signs $IM_{CF}[i]$, the method can comprise a transmission from the medium 1 each time of the second distinctive sign $IM_{CF}[i]$ used in a first combination OWHF at the first level and, at each subsequent level, of the intermediate result $V_2$, $V_6$ of the irreversible functions OWHF, which is used so as to be combined successively with the corresponding intermediate result $V_1$, $V_5$ obtained on the basis of the second distinctive sign $IM_{CF}[i]$, until the deduced distinctive sign $O\_IM_{CF}$ is obtained.

For the implementation of the method of the invention, there is provided a system composed at least of the medium 1 comprising for example at least one integrated circuit known in the art, chosen so as to have data storage means, calculation means, so as to compile in full or in part the Table 5 of FIG. 2, and means of direct dialogue, "off-line" with respect to a main computer of a financial institution or one for managing payments by electronic means, with at least one device 3 whose manner of operation is also described hereinabove.

With a view to the operation thereof, the device 3 comprises means of direct dialogue so as to talk to the medium 1, means of random or pseudo-random guesstimation, means of calculation of the elements cited hereinabove, means of comparison and of verification of miscellaneous data, according to the description hereinabove, and means of storage of at least the electronic cheque issued by the medium 1, if the comparisons and verifications envisaged determine the authenticity of the said cheque.

In a first embodiment of the system (FIG. 1), the medium can be an integrated circuit card 2 such as explained hereinabove and the device 3 can be a terminal 4 which is able to read from and to write to the card 2 and which can be connected, for example by telephonic network, to the main computer of the corresponding bank BB, at certain chosen moments, with a view to transferring thereto the cheques and related data so as to credit the authenticated amounts to a bank account of the recipient of the cheques, the holder of the device 3.

Figure 4:
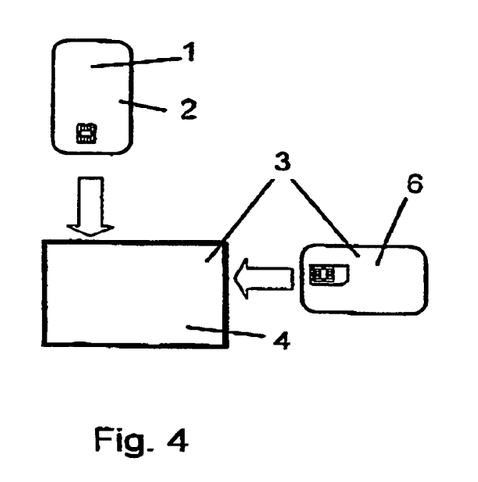
FIG. 4 shows diagrammatically a variant of the system, in which the device consists of at least two mutually detachable elements.

In another embodiment (FIG. 4) of the system of the invention, the medium 1 is also an integrated circuit card 2 but the device 3 comprises a read and write terminal 4 for the card 2 and is furnished with means for transferring data received to detachable storage means of the actual terminal 4. The latter means may be an integrated circuit card 6 of the same type as the card 2 and may be used so as for example to transport the cheques and data to the bank BB.

It goes without saying that by the phraseology "at least" one element or one method step, the person skilled in the art understands, after reading the explanation of this element or step, the way or ways and possibilities for applying the repetition thereof.

It should be understood that the invention is in no way limited to the embodiments described and that many modifications may be made to the latter without departing from the scope of the claims.

Figure 5:
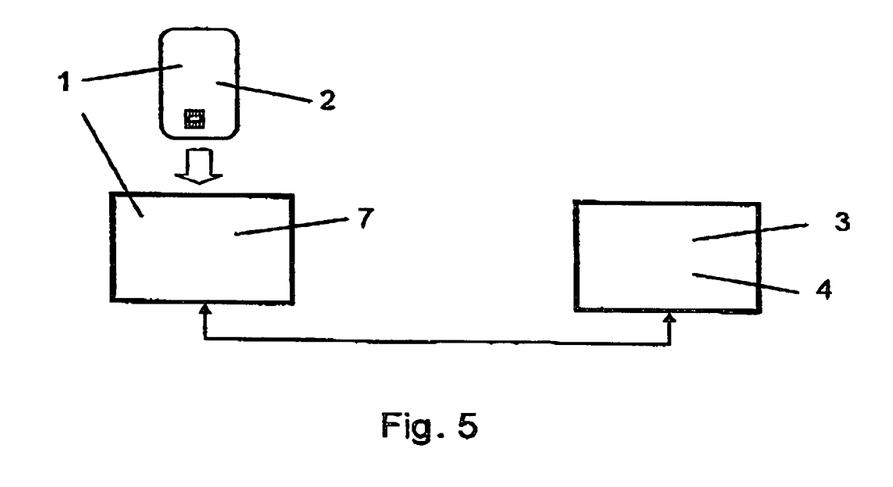
FIG. 5 shows diagrammatically another variant of the system, in which the medium consists of at least two mutually detachable elements.

Thus, in yet another embodiment of the system of the invention, if the device 3 is remote from the issuer of the payment and/or in the case of steps of abovementioned reverse authentication of the device 3 by the medium 1, the latter can comprise, on the one hand, an abovementioned integrated circuit card 2 and, on the other hand, a communication element 7 for dialogue between this card 2 and the device 3. This can be the case in respect of "off-line" payments within the framework of telecommunication networks of the INTERNET type when a third party must be able to make a remote payment so as to obtain, or to have access to, services or information without it being necessary for him to refer directly to a financial institution or to an institution for managing payments of this kind.

Figure 6:
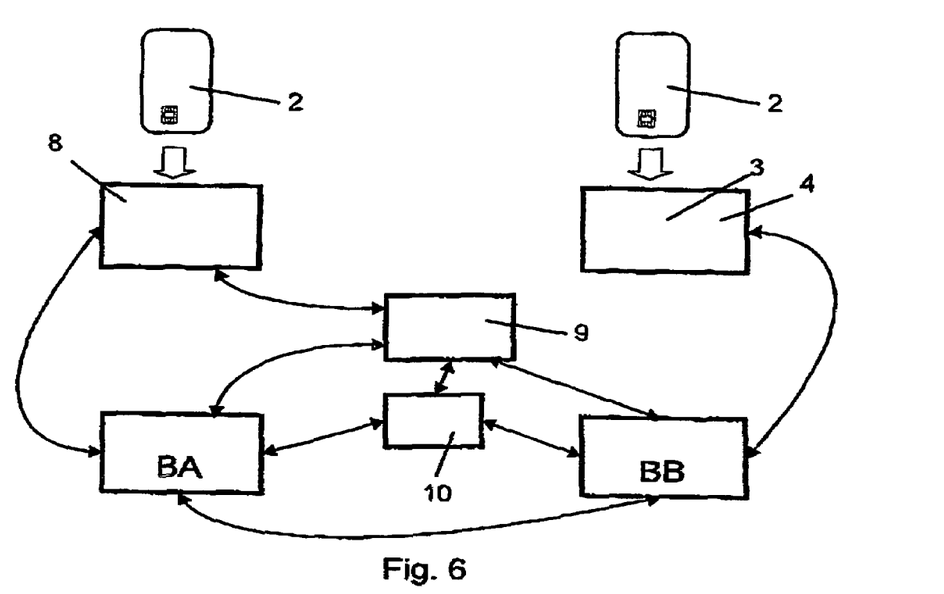
FIG. 6 shows diagrammatically a system of the invention, integrated into a simple circuit for payment via banks.

FIG. 6 shows by way of example a diagram of communication between the various means and financial institutions in a basic type of configuration of the system of the invention. A card 2 is loaded with (templates of) electronic cheques and data in a terminal 8 of the corresponding issuing bank BA. Thereafter, this card 2 is presented by its holder to a merchant equipped with a device 3 for the payment transactions. When he wishes, the merchant links his device 3 up to his bank BB so as to transfer thereto accumulated electronic cheques in particular. The bank BB submits for payment, to the bank BA, electronic cheques emanating therefrom (clearing of accounts, transfer of money).

The said banks BA and BB can be one and the same institution.

An institution 9 for managing electronic payments can form part of the assembly for managing, arbitrating and servicing the relevant hardware. A certificate authority 10, such as a national bank, must intervene in accordance with the law in order to ensure that there is no illegal creation of monetary values.

It is apparent that in the invention, according for example to the choice of the number h of distinctive signs $IM_{CF}[1 \ldots h]$, a cheque template CF can give rise to only one electronic cheque or to several of them, each being different by virtue of the distinctive sign $IM_{CF}[1 \ldots h]$ definitively associated therewith.

For example also, the common base value $SD_{CF}$ can be different at each loading of the medium 1 and/or for each cheque template CF.

A medium 1 can receive, during loading, several cheque templates CF and a common value $SD_{CF}$ for each.

In Table 5, the so-called base values $S[1], \ldots S[k]$ are represented as obtained directly after the irreversible function SOWF applied to the common value $SD_{CF}$.

It goes without saying that in respect of any step of the method described hereinabove, the person skilled in the art can choose and combine the necessary means for implementing the method with the aid of the system of the invention, the said means being known to him.

Codes and Denominations Used
AC_C Authentication code for the device 3
AC_I Authentication code for the bank BA
BA Bank issuing medium 1, financial institution issuing 1
BB Bank of the device 3
CA Certificate authority (see 10)
CDP Cheque dynamic parameters
$CERT_B$ Public key certificate signed by the authority
CF Cheque template DES Data encryption standard
h Number of distinctive signs $IM_{CF}[i]$ given by the institution BA
i Index of the distinctive sign $IM_{CF}[1 \ldots h]$ used
$ID_B$ Identification of the bank BA
$ID_C$ Identification of medium 1/card 2
$ID_D$ Identification of the device
$ID_{CF}$ Identification of cheque template
$IM_{CF}$ Distinctive sign of a cheque
$IM_{CF}[1 \ldots h]$ Series of h distinctive signs of cheques
$IM_{CF}[i]$ Distinctive sign of index i for a cheque
j Index of the chaining values Z
k Number of columns in the Table 5
m Order of intermediate values
MAC Message authentication code
n Number of levels in the Table 5
N Level or order of a value in a column of the Table 5
O_AC_I Commitment value
$O\_IM_{CF}$ Deduced distinctive sign
OWF (One Way Function), irreversible function
OWHF (One Way Hash Function), irreversible compression function
$PK_B$ Public key of BA
$PK_{CA}$ Public key of the certificate authority CA
RSA (Rivest, Shamir and Adleman), algorithm from RSA Data Security Inc., Redwood City, Calif. USA
$S[1], \ldots S[k]$ Base values associated with a distinctive sign $IM_{CF}[i]$
$SD_{CF}$ Common base value
$SIGN_{CF}$ Digital signature calculated by BA
SK Calculated secret Key
SOWF (Seed One Way Function), irreversible function for calculating base values
$SP_{CF}$ Static parameters of cheque templates
SVK Secret verification key of the bank BA
Triple DES (Triple Data Encryption Standard), data encryption system applying the DES algorithm three times
Z Chaining values

LEGEND FOR THE FIGURES

1 Medium
2 Payment card
3 Device
4 Payment terminal
5 Table of FIG. 2
6 Integrated circuit card of the device 3
7 Communication element of the medium 1
8 Terminal of the bank BA
9 Institution for managing electronic payment
10 Certificate authority (CA)

The invention claimed is:

1. A method of offline payment, comprising:
    calculating a first authentication code based on a payment amount and a secret verification key;
    calculating a commitment value by an electronic check medium, having a memory and an integrated circuit residing thereon, calculating the commitment value including calculating the commitment value based on the first authentication code and a secret key;
    communicating the commitment value to a terminal configured to receive a payment from the electronic check medium;
    determining a random/pseudo-random value by the terminal in response to receiving at least the commitment value, the random/pseudo-random value being configured to verify that the electronic check medium is authentic;
    communicating the random/pseudo-random value to the electronic check medium
    determining a second authentication code by the electronic check medium, the second authentication code being based on the random/pseudo-random value;
    communicating the second authentication code to the terminal;
    verifying the received second authentication code by comparing the second authentication code with the random/pseudo-random value; and
    accepting payment from the electronic check medium in response to verifying the second authentication code.

2. The method of claim 1, further comprising calculating the first authentication code, wherein the secret verification key verifies an issuing bank.

3. The method of claim 1, further comprising calculating the first authentication code, wherein the first authentication code contains information specifying a maximum number of times that the electronic check medium may be used to make payments therefrom.

4. The method of claim 3 further comprising:
    calculating a number of times that payment has been made from the electronic check medium; and
    permitting payment only when the electronic check medium has not been used for payment more times than the maximum number of times.

5. The method according to claim 1 wherein the first authentication code is calculated based on an identification of a party that is to receive payment.

6. The method of claim 1, wherein the payment amount corresponds to an amount to be received by the electronic check medium from the terminal.

7. The method of claim 1, further comprising generating an audit trail by the electronic check medium, the audit trail corresponding to the sum of previous payment amounts plus the payment amount made to the terminal, such that a predefined maximum transaction amount associated with the electronic check medium is not exceeded.

8. The method of claim 1, wherein the first authentication code is calculated by performing a first cryptographic function on the secret verification key and the payment amount and the commitment value is calculated by performing a second cryptographic function on the first authentication key.

9. An offline payment system, comprising:
    an electronic check medium, having a memory and an integrated circuit residing thereon, the integrated circuit including:
        calculating means for calculating commitment value based on a first authentication code and a secret key, for calculating the first authentication code based on a payment amount and a secret verification key, and for calculating a second authentication code based on a random/pseudo-random value; and
        means for communicating the commitment value and the second authentication code;
    means for calculating the random/pseudo-random value in response to receiving at least the commitment value, the random/pseudo-random value being configured to verify that the electronic check medium is authentic;
    means for communicating to the random/pseudo-random value to the electronic check medium;
    means for verifying the received second authentication code by comparing the second authentication code with the random/pseudo-random value; and means for accepting payment from the electronic check medium in response to verifying the second authentication code.

10. The system of claim 9, wherein the secret verification key verifies an issuing bank.

11. The system of claim 9, wherein the first authentication code contains information specifying a maximum number of times that the electronic check medium may be used to make payments therefrom.

12. The system of claim 11, further comprising:
means for calculating a number of times that payment has been made from the electronic check medium; and
means for permitting payment only when the electronic check medium has not been used for payment more times than the maximum number of times.

13. The system of claim 9 wherein the first authentication code is calculated based on an identification of a party that is to receive payment.

14. The system of claim 9, further comprising means for generating an audit trail by the electronic check medium, the audit trail corresponding to the sum of previous payment amounts plus the payment amount made to the terminal, such that a predefined maximum transaction amount associated with the electronic check medium is not exceeded.

15. The system of claim 9, wherein the first authentication code is calculated by performing a first cryptographic function on the secret verification key and the payment amount and the commitment value is calculated by performing a second cryptographic function on the first authentication key.

16. An offline payment system, comprising:
an electronic check medium including:
calculating means for calculating a first authentication code based on a payment amount and a secret verification key, for calculating a commitment value based on a first authentication code and a secret key, and for calculating a second authentication code based on a random/pseudo-random value, and
communicating means for communicating the commitment value and the second authentication code; and
a terminal configured to receive a payment from the electronic check medium, the terminal including:
means for determining the random/pseudo-random value in response to receiving at least the commitment value,
means for verifying the received second authentication code by comparing the second authentication code with the random/pseudo-random value,
means for communicating to the electronic check medium the random/pseudo-random value, and
means for accepting payment from the electronic check medium in response to verifying the second authentication code.

17. The system of claim 16, wherein the first authentication code contains information specifying a maximum number of times that the electronic check medium may be used to make payments.

18. The system of claim 16 wherein the calculating means include means for calculating the first authentication code based on an identification of a party that is to receive payment.

19. The system of claim 16, wherein the terminal includes means for generating an audit trail corresponding to the sum of previous payment amounts plus the payment amount made to the terminal, such that a predefined maximum transaction amount associated with the electronic check medium is not exceeded.

20. The system of claim 16, wherein the calculating means include:
means for calculating the first authentication code by performing a first cryptographic function on the secret verification key; and
means for calculating the payment amount and the commitment value by performing a second cryptographic function on the first authentication key.

* * * * *